UNITED STATES PATENT OFFICE.

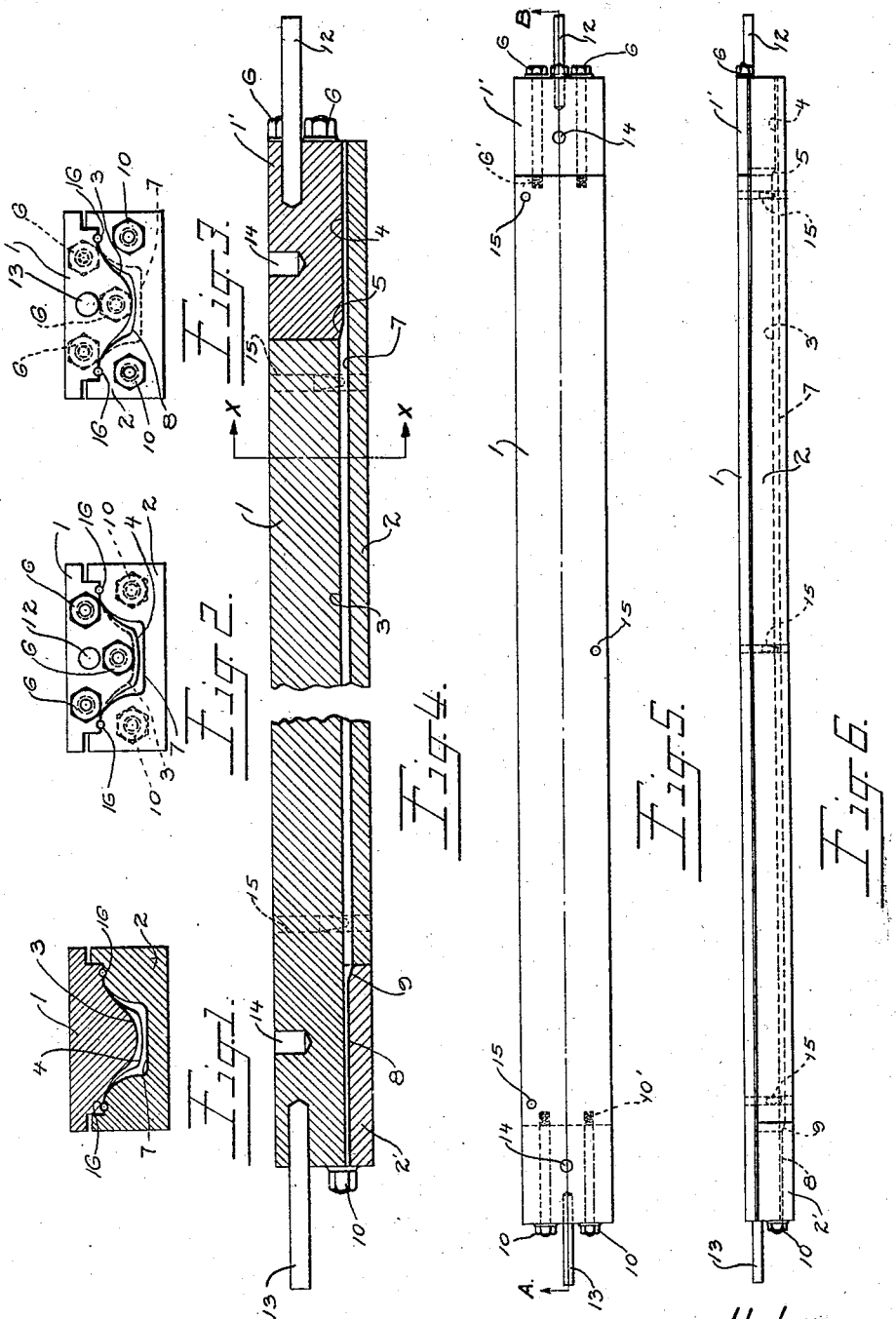

ADRIAN O. ABBOTT, JR., OF DETROIT, MICHIGAN, ASSIGNOR TO MORGAN AND WRIGHT, A CORPORATION OF MICHIGAN.

MOLD FOR HEAVY-TRUCK TIRE FLAPS.

1,420,803.      Specification of Letters Patent.      Patented June 27, 1922.

Application filed October 4, 1920. Serial No. 414,494.

*To all whom it may concern:*

Be it known that I, ADRIAN O. ABBOTT, Jr., a citizen of the United States, residing at Detroit, county of Wayne, and State of Michigan, have invented certain new and useful Improvements in Molds for Heavy-Truck Tire Flaps, of which the following is a full, clear, and exact description.

This invention relates to molds for rubber articles and particularly to a mold for manufacturing heavy truck tire flaps.

In the manufacture of heavy truck tire flaps, it has been customary heretofore to alter the sections of the flap at the ends so that they might be lapped without material increase in thickness at the joint. According to the old practice, the flaps were molded with a uniform section throughout and afterwards peeled or skived off at the ends. Hand skiving is an arduous operation requiring no little dexterity and the uniformity of the product obtained varied with the ability of the operator.

The present invention aims to provide a mold for shaping the ends of the flap so that lapped they have substantially the same thickness as the unaltered intermediate body portion of the flap. It also aims to eliminate one operation, the hand skiving, that has heretofore been required to make flaps and it endeavors to insure uniformity in the manufactured product.

The invention is illustrated in the accompanying drawings, in which,

Fig. 1 is a cross section through an intermediate or body-forming portion of the mold taken on the line X—X, Fig. 4;

Figs. 2 and 3 are end views looking at the right and left hand ends respectively of the assembled mold as shown in Fig. 6;

Fig. 4 is a central longitudinal section on the line A—B, Fig. 5, and

Figs. 5 and 6 are a plan view and side elevation respectively of an assembled mold.

The mold illustrated is designed to form heavy truck tire flaps of a trough shape in cross section having a smooth curved inner face for engagement with the inner tube and a flat rim-engaging face flanked by flaring side walls or flanges whose flexibility towards their edges is increased by a gradual decrease in their thickness. The mold has upper and lower sections indicated generally by the numerals 1 and 2. The upper section 1 has more or less shaped convex surfaces indicated at 3 and 4 for forming the inside or tube-engaging surface of the flap, the face 3 being straight from the left-hand end of the mold as viewed in Fig. 4 to a point short of the right-hand end where by a short downward bevel 5 it is joined to the surface 4. The surface 4 is formed on a section 1' which is bolted to the section 1 as indicated at 6, the bolts passing loosely through the section 1' and being threaded into the section 1 as illustrated at 6' in Fig. 5.

The lower section 2 of the mold has surfaces 7 and 8 shaped to form the rim-engaging surface of the flap. By an upwardly inclined bevel 9 surface 7 passes into the surface 8 which is similar in cross section and reduces the outside of one end of the flap so as to fit within the depression formed by the surface 4 on the other end of the flap. The surface 8 is formed on a block or section 2' which is bolted as indicated at 10 to the section 7, the bolts being threaded as indicated at 10' into the base section 7.

Lifting rods or handles 12 and 13 are provided at opposite ends of the mold and sockets 14 are also formed in the rubber section of the mold for convenience in shifting. Dowel pins 15 are also provided to locate the sections of the mold in proper superimposed relation and flash cavities 16 are preferably provided adjacent the upper extremities of the flap-forming cavity, these being intended of course to permit any excess rubber composition to escape.

In the manufacture of the flaps the bottom section of the mold is lined with fabric and then a requisite quantity of rubber stock placed over the fabric. After this, one or more plies of fabric are placed on top of the rubber stock and the top half of the mold positioned. The mold is then placed in a vulcanizer, such as a press having steam heated platens and the cure effected. The mold is made of sufficient length to allow for shrinkage that follows curing and for trimming off the ends of the flap to the exact length desired. After curing, openings for a valve stem are punched in the ends of the flap intermediate the length of their reduced portions and the over-flow or flash around the edges trimmed off where necessary.

Having thus described my invention, what

I claim and desire to protect by Letters Patent is:

1. A mold for making tire flaps having upper and lower sections with flap-forming surfaces of trough-shaped cross section, and projections at opposite ends of the mold for reducing the ends of a flap so as to interfit with one another when lapped.

2. A mold having upper and lower sections having flap-forming surfaces defining a trough-shaped cavity, each of said sections having bolted thereto a block having a similar flap-forming surface projecting towards the flap-forming surface of the other section so as to reduce the thickness of the article being molded at its opposite ends.

Signed at Detroit, county of Wayne, State of Michigan, this 27th day of September, 1920.

ADRIAN O. ABBOTT, Jr.